(12) United States Patent
Chikugo et al.

(10) Patent No.: US 10,391,431 B2
(45) Date of Patent: Aug. 27, 2019

(54) STRAINER DEVICE

(71) Applicant: Komatsu Ltd., Tokyo (JP)

(72) Inventors: Hiroyuki Chikugo, Oyama (JP);
Shuuji Hori, Oyama (JP); Yuta Baba, Oyama (JP)

(73) Assignee: Komatsu Ltd., Tokyo (JP)

( * ) Notice: Subject to any disclaimer, the term of this patent is extended or adjusted under 35 U.S.C. 154(b) by 77 days.

(21) Appl. No.: 15/513,586

(22) PCT Filed: Sep. 30, 2014

(86) PCT No.: PCT/JP2014/076152
§ 371 (c)(1),
(2) Date: Mar. 23, 2017

(87) PCT Pub. No.: WO2016/051525
PCT Pub. Date: Apr. 7, 2016

(65) Prior Publication Data
US 2017/0296947 A1   Oct. 19, 2017

(51) Int. Cl.
*B01D 35/153* (2006.01)
*B01D 35/00* (2006.01)
(Continued)

(52) U.S. Cl.
CPC .......... *B01D 35/153* (2013.01); *B01D 29/114* (2013.01); *B01D 35/005* (2013.01);
(Continued)

(58) Field of Classification Search
CPC .................. B01D 35/153; B01D 29/11; B01D 2201/167; B01D 2201/291; B01D 29/114;
(Continued)

(56) References Cited

U.S. PATENT DOCUMENTS 9,700,818 B2    7/2017  Marshall et al.
2010/0199844 A1  8/2010  Hilberer
(Continued)

FOREIGN PATENT DOCUMENTS

CN    2035267 U    4/1989
CN    103458985 A   12/2013
(Continued)

OTHER PUBLICATIONS

International Search Report dated Dec. 16, 2014, issued for PCT/JP2014/076152.

*Primary Examiner* — Terry K Cecil
(74) *Attorney, Agent, or Firm* — Locke Lord LLP

(57) ABSTRACT

A strainer device includes a strainer element; a first lid member that covers an upper opening of the strainer element; a second lid member that covers a lower opening of the strainer element and has a fitting hole in a portion surrounded by the strainer element; a delivery pipe protruding upward inside a hydraulic oil tank in a state in which the delivery pipe is fitted into the fitting hole of the second lid member; and a check valve arranged at the first lid member. The check valve includes a valve main body having a valve passage whose one end opens to the internal space of the strainer element and whose other end opens to inside of the hydraulic oil tank; and a valve body which is arranged to be able to move in a vertical direction with respect to a valve seat provided in the valve passage.

5 Claims, 6 Drawing Sheets

(51) Int. Cl.
- *B01D 29/11* (2006.01)
- *F15B 21/04* (2019.01)
- *F15B 1/26* (2006.01)
- *F15B 21/041* (2019.01)
- *B01D 35/027* (2006.01)
- *B01D 36/00* (2006.01)
- *F01M 1/10* (2006.01)

(52) U.S. Cl.
CPC ....... *B01D 35/0276* (2013.01); *B01D 36/001* (2013.01); *F15B 1/26* (2013.01); *F15B 21/041* (2013.01); *B01D 2201/167* (2013.01); *B01D 2201/291* (2013.01); *F01M 2001/1085* (2013.01)

(58) Field of Classification Search
CPC .............. B01D 35/005; B01D 35/0276; B01D 36/001; F15B 1/26; F15B 21/041; F01M 2001/0185; F01M 2001/1007
See application file for complete search history.

(56) References Cited

U.S. PATENT DOCUMENTS

| | | |
|---|---|---|
| 2012/0168359 A1 | 7/2012 | Marshall et al. |
| 2013/0092611 A1 | 4/2013 | Offerle et al. |

FOREIGN PATENT DOCUMENTS

| | | | |
|---|---|---|---|
| CN | 103485857 A | | 1/2014 |
| JP | S56168658 U | | 12/1981 |
| JP | 63-097702 U | | 6/1988 |
| JP | 63097702 U | * | 6/1988 |
| JP | 63-160908 U | | 10/1988 |
| JP | 63160908 U | * | 10/1988 |
| JP | H05047501 U | | 6/1993 |
| JP | 05-187401 A | | 7/1993 |
| JP | 09-119541 A | | 5/1997 |
| JP | 2000065002 A | * | 3/2000 |
| JP | 2011-256956 A | | 12/2011 |
| JP | 2013194900 A | | 9/2013 |

* cited by examiner

STRAINER DEVICE

FIELD

The present invention relates to a strainer device which is attached to a delivery pipe of a hydraulic oil tank and which filters oil with a strainer element when delivering oil stored in the hydraulic oil tank from the delivery pipe.

BACKGROUND

The hydraulic oil tank that stores oil to be delivered to oil hydraulic equipment is mounted on a working machine including the oil hydraulic equipment such as an oil hydraulic pump. The hydraulic oil tank is a container including a delivery pipe and an inflow pipe. The oil stored in the hydraulic oil tank is delivered to the oil hydraulic equipment through the delivery pipe. On the other hand, oil discharged from the oil hydraulic equipment is returned to the inside of the hydraulic oil tank through the inflow pipe.

Foreign objects such as chip powder and bubbles (air) may be mixed in the oil returned to the hydraulic oil tank. Further, foreign objects may be mixed inside the hydraulic oil tank. When the oil in which the foreign objects and the bubbles are still mixed is delivered from the hydraulic oil tank, the oil significantly affects the service life of the oil hydraulic equipment.

Therefore, in this type of hydraulic oil tank, normally, a filter device and/or a strainer device are provided to the inflow pipe and the delivery pipe, and a baffle plate is provided between the inflow pipe and the delivery pipe. Specifically, foreign objects are removed from the oil returned to the hydraulic oil tank by providing the filter device to the inflow pipe, and filtered oil is delivered to the oil hydraulic equipment by providing the strainer device to the delivery pipe. The baffle plate facilitates removing bubbles in the oil by diverting a route of the oil from the inflow pipe to the delivery pipe and prevents a case where oil containing bubbles is delivered to the oil hydraulic equipment (for example, see Patent Literature 1 and Patent Literature 2).

CITATION LIST

Patent Literature

Patent Literature 1: Japanese Laid-open Patent Publication No. 05-187401
Patent Literature 2: Japanese Laid-open Patent Publication No. 2011-256956

SUMMARY

Technical Problem

By the way, the size of the hydraulic oil tank varies depending on the type and the size of the working machine where the hydraulic oil tank is mounted. In a case of a hydraulic oil tank whose capacity is relatively large, it is possible to secure a long route of the oil from the inflow pipe to the delivery pipe, so that it is possible to effectively prevent mixing of bubbles. However, in a hydraulic oil tank whose capacity is relatively small, it may not be possible to sufficiently secure a route of the oil from the inflow pipe to the delivery pipe. In this case, there is a risk that the oil reaches the strainer device before the bubbles are not sufficiently removed and the bubbles that passes through a strainer element and enters the strainer device aggregate in an internal space of the strainer element covered by an upper lid member and remain as a lump. Even in a hydraulic oil tank whose capacity is large, when the amount of oil delivered from the delivery pipe is large and a retention time of the oil in the hydraulic oil tank is small, there is a risk that the bubbles are not sufficiently removed and the same problem as described above may be caused. Further, when the inside of the hydraulic oil tank is filled with the hydraulic oil during assembling or oil change, there is a risk that a lot of air remains inside the strainer.

Normally, the delivery pipe opens at a lower position of the hydraulic oil tank and delivers oil stored in a lower layer, so that the air that remains as a lump is not immediately delivered to the oil hydraulic equipment. However, when the working machine is tilted or the amount of oil delivered from the delivery pipe is large, there is a risk that a part of the lump of air is delivered from the delivery pipe to the oil hydraulic equipment along with the oil.

In view of the above situation, an object of the present invention is to provide a strainer device that can reliably prevent mixture of air into the oil to be delivered from the delivery pipe.

Solution to Problem

To solve the problem and achieve the object, a strainer device according to the present invention includes: a strainer element having a tubular shape including an internal space at a central portion thereof; a first lid member that covers an upper opening of the strainer element; and a second lid member that covers a lower opening of the strainer element and includes a fitting hole in a portion surrounded by the strainer element, wherein the strainer device filters oil with the strainer element when delivering oil stored in a hydraulic oil tank from a delivery pipe by installing the delivery pipe protruding upward inside the hydraulic oil tank in a state in which the delivery pipe is fitted into the fitting hole of the second lid member, the first lid member includes a check valve, and the check valve includes: a valve main body including a valve passage whose one end opens to the internal space of the strainer element and whose other end opens to inside of the hydraulic oil tank; and a valve body which is movably arranged in a vertical direction with respect to a valve seat provided in the valve passage, comes into contact with the valve seat by its own weight and closes the valve passage.

Moreover, in the strainer device according to the present invention, when a preset amount of air is retained in the internal space of the strainer element, the valve body in the check valve is separated from the valve seat by a buoyancy force of the air and opens the valve passage.

Moreover, in the strainer device according to the present invention, the check valve is provided so as to form an air retention chamber that stores the air retained in the internal space of the strainer element and discharge the air stored in the air retention chamber to the hydraulic oil tank.

Moreover, in the strainer device according to the present invention, the air retention chamber is provided on the first lid member.

Moreover, in the strainer device according to the present invention, the air retention chamber is provided on the valve main body.

Advantageous Effects of Invention

According to the present invention, even when oil where bubbles are not sufficiently removed reaches the strainer device and the bubbles remain as an air lump in an internal space of the strainer element covered by the first lid member, the check valve opens, so that the air lump is discharged to the inside of the hydraulic oil tank. Therefore, it is possible to reliably prevent the mixture of air into the oil to be delivered from the delivery pipe.

DESCRIPTION OF EMBODIMENTS

Hereinafter, preferred embodiments according to the present invention will be described in detail with reference to the accompanying drawings.

First Embodiment

Figure 1:
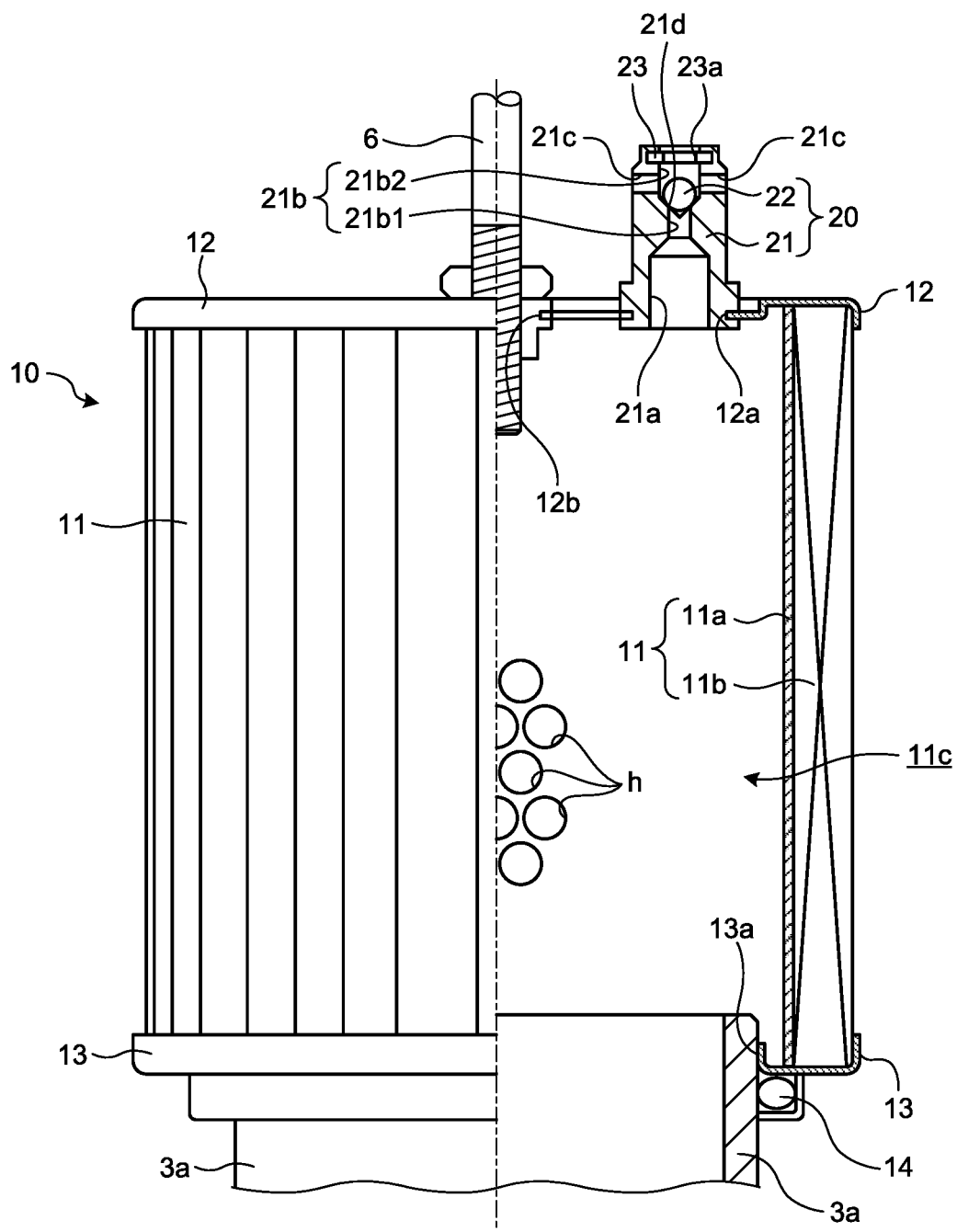
FIG. 1 is a half cross-sectional view viewed from the side of a main part of a hydraulic oil tank where a strainer device which is a first embodiment of the present invention is applied.
Figure 2:
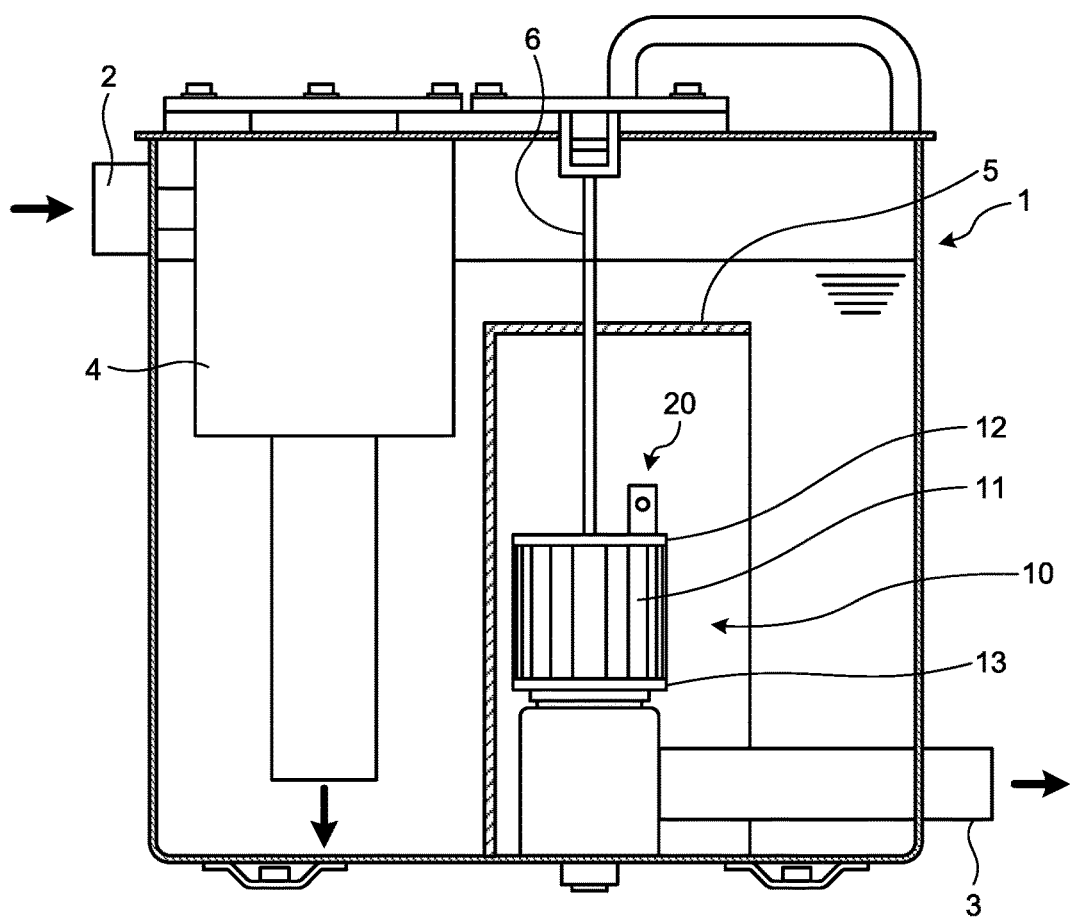
FIG. 2 is a cross-sectional side view of the hydraulic oil tank illustrated in FIG. 1.

FIG. 1 illustrates a strainer device which is a first embodiment of the present invention. A strainer device 10 illustrated here is attached inside a hydraulic oil tank 1 mounted on a working machine as illustrated in FIG. 2. The hydraulic oil tank 1 is a sealed container having a rectangular parallelepiped shape formed by metal plates and includes an inflow pipe 2 and a delivery pipe 3.

The inflow pipe 2 is to return oil discharged from oil hydraulic equipment not illustrated in the drawings to the hydraulic oil tank 1. The inflow pipe 2 opens to the outside of the hydraulic oil tank 1 at an upper portion of the hydraulic oil tank 1 and opens to the inside of the hydraulic oil tank 1 at a lower portion of the hydraulic oil tank 1. The inflow pipe 2 is provided with a filter device 4 at a portion provided inside the hydraulic oil tank 1. The filter device 4 filters the oil to be returned to the hydraulic oil tank 1 through the inflow pipe 2.

The delivery pipe 3 is to deliver the oil stored in the hydraulic oil tank 1 to the oil hydraulic equipment not illustrated in the drawings. The delivery pipe 3 opens to the outside of the hydraulic oil tank 1 at a lower portion of the hydraulic oil tank 1 and opens to the inside of the hydraulic oil tank 1 at a lower portion of the hydraulic oil tank 1. More specifically, as illustrated in FIG. 1, in the delivery pipe 3, a portion 3a that opens to the inside of the hydraulic oil tank 1 protrudes upward from an inner bottom portion of the hydraulic oil tank 1 and the strainer device 10 is provided at an upper end portion of the portion 3a.

The strainer device 10 is to filter the oil delivered from the hydraulic oil tank 1 through the delivery pipe 3. The strainer device 10 includes a strainer element 11 formed into a cylindrical shape, an upper lid member (a first lid member) 12 provided at one end portion of the strainer element 11, and a lower lid member (a second lid member) 13 provided at the other end portion of the strainer element 11.

The strainer element 11 is formed by a substrate 11a having a metallic cylindrical shape where a large number of passing holes h are substantially uniformly formed in the entire surface (only a part is illustrated in FIG. 1) and a filter body 11b arranged on an outer circumferential surface of the substrate 11a. The inside diameter of the substrate 11a is formed to be sufficiently larger than the outside diameter of the delivery pipe 3. The strainer element 11 filters the oil by preventing foreign objects from passing through the filter body 11b when the oil passes from an outer circumferential surface to an internal space 11c.

The upper lid member 12 and the lower lid member 13 have a disk shape formed by a sheet metal and also have a cylindrical shape in which the entire outer circumferential edge is bent at a right angle. End portions of the strainer element 11 are each inserted into to the bent cylindrical portions of the upper lid member 12 and the lower lid member 13, so that the upper lid member 12 and the lower lid member 13 are attached to the strainer element 11 in a state in which the upper lid member 12 and the lower lid member 13 cover the internal space 11c of the strainer element 11.

A fitting hole 13a is provided at a central portion of the lower lid member 13. The fitting hole 13a is a circular cut-out portion having an inside diameter where an opening end portion of the delivery pipe 3 can be inserted. At a portion to be an opening circumferential edge portion of the fitting hole 13a in the lower lid member 13, a seal ring 14 is arranged, which seals a gap between an outer circumferential surface of the delivery pipe 3 and an inner circumferential surface of the fitting hole 13a when the opening end portion of the delivery pipe 3 is inserted.

On the other hand, in the upper lid member 12 of the strainer device 10, a check valve 20 is provided at a position shifted from the center and at a portion corresponding to the internal space 11c of the strainer element 11. The check valve 20 is to discharge air to the inside of the hydraulic oil tank 1 when the air remains in the internal space 11c of the strainer element 11 covered by the upper lid member 12. The check valve 20 includes a valve main body 21 and a valve body 22.

The valve main body 21 has an external form of a substantially column shape and is attached to a caulking hole 12a of the upper lid member 12 through a lower end portion thereof. The valve main body 21 is provided with an air retention chamber 21a, a valve passage 21b, and an auxiliary discharge passage 21c. The air retention chamber 21a is an empty space which has a columnar shape with a relatively large diameter and which is provided so as to have an opening in a lower end surface of the valve main body 21. An upper end portion of the air retention chamber 21a is formed into a taper shape so that the inside diameter gradually decreases upward. The valve passage 21b is formed upward from the upper end portion of the air retention chamber 21a and has an opening in the upper end surface of the valve main body 21. In the first embodiment, the valve passage 21b is formed by a lower small diameter portion 21b1 and an upper large diameter portion 21b2. A valve seat 21d is formed at a connection portion between the small diameter portion 21b1 and the large diameter portion 21*b*2. The valve seat 21*d* is a circular ridge line portion formed between a taper portion formed so that the inside diameter gradually decreases downward from the lower end of the large diameter portion 21*b*2 and the small diameter portion 21*b*1. The auxiliary discharge passage 21*c* extends substantially horizontally along a radial direction from the large diameter portion 21*b*2 of the valve passage 21*b* and has an opening in an outer circumferential surface of the valve main body 21. Although not clearly illustrated in the drawings, in the first embodiment, a plurality of auxiliary discharge passages 21*c* are provided at regular intervals with each other along a circumferential direction.

The valve body 22 is a spherical member formed by a material such as, for example, ceramic, whose specific gravity is greater than that of the oil stored in the hydraulic oil tank 1. The valve body 22 is formed so as to have a diameter smaller than that of the large diameter portion 21*b*2 of the valve passage 21*b* and greater than that of the small diameter portion 21*b*1. When the valve body 22 is inserted from the large diameter portion 21*b*2 to the valve passage 21*b*, the valve body 22 comes into contact with the valve seat 21*d* due to the weight of the valve body 22 itself, so that it is possible to close the valve passage 21*b*.

As obvious from the drawings, a drop-off prevention member 23 is attached to the large diameter portion 21*b*2 of the valve passage 21*b*. The drop-off prevention member 23 has a disk shape having a central hole 23*a* whose inside diameter is smaller than the valve body 22. The drop-off prevention member 23 prevents the valve body 22 from dropping off from the large diameter portion 21*b*2 of the valve passage 21*b* and allows oil to pass through. A gap is secured along the vertical direction between the valve seat 21*d* of the valve passage 21*b* and the drop-off prevention member 23 so as to be able to separate the valve body 22 from the valve seat 21*d*.

Reference numeral 5 in FIG. 2 denotes a baffle plate provided so as to separate between the delivery pipe 3 and the inflow pipe 2 inside the hydraulic oil tank 1 and surround the circumference of the delivery pipe 3. Reference numeral 12*b* in FIG. 1 denotes an attaching bolt insertion hole provided at a central portion of the upper lid member 12.

The strainer device 10 configured as described above is installed in a state in which the delivery pipe 3 of the hydraulic oil tank 1 is fitted into the fitting hole 13*a* of the lower lid member 13 and further an attaching bolt 6 attached to the upper lid member 12 through an attaching bolt insertion hole 12*b* is interposed between the upper lid member 12 and an upper wall of the hydraulic oil tank 1, so that the strainer device 10 is attached inside the hydraulic oil tank 1 without being dropped off from the delivery pipe 3.

The oil flowing into the inside of the hydraulic oil tank 1 through the inflow pipe 2 is detoured by a baffle plate 5 and thereafter reaches around the strainer device 10. Further, the oil stored around the strainer device 10 passes through the strainer element 11, is absorbed into the internal space 11*c* of the strainer element 11, and is delivered to the oil hydraulic equipment (not illustrated in the drawings) through the delivery pipe 3.

During this time, the oil flown into the hydraulic oil tank 1 through the inflow pipe 2 is filtered by the filter device 4 at all times. Therefore, even if foreign objects such as chip powder are mixed into the oil discharged from the oil hydraulic equipment, the foreign objects are removed by the filter device 4, so that there is no risk that the foreign objects enter the hydraulic oil tank 1. Further, bubbles are removed from the oil delivered to the oil hydraulic equipment (not illustrated in the drawings) through the delivery pipe 3 while the oil is detoured by the baffle plate 5 and foreign objects are removed from the oil by the strainer device 10. Therefore, there is no risk that oil mixed with foreign objects and air is delivered to the oil hydraulic equipment (not illustrated in the drawings).

On the other hand, even in the hydraulic oil tank 1 described above, when bubbles are not fully removed and oil mixed with bubbles passes through the strainer element 11, there is a risk that air remains as a lump in the internal space 11*c* of the strainer element 11 covered by the upper lid member 12. However, according to the strainer device 10 of the first embodiment, the air remaining in the internal space 11*c* of the strainer element 11 is accumulated in the air retention chamber 21*a* provided in the valve main body 21 of the check valve 20 and the air applies a buoyancy force to the valve body 22 through the small diameter portion 21*b*1 of the valve passage 21*b*.

Therefore, when the buoyancy force due to the air exceeds a force that causes the valve body 22 to come into contact with the valve seat 21*d*, the valve body 22 is separated from the valve seat 21*d* and the air remaining in the valve passage 21*b* and the air retention chamber 21*a* is discharged to the inside of the hydraulic oil tank 1 through the valve passage 21*b* and the auxiliary discharge passage 21*c*. In other words, when the sizes of the valve passage 21*b* and the air retention chamber 21*a* are set so that a buoyancy force that can separate the valve body 22 from the valve seat 21*d* is generated, it is possible to open the check valve 20 by applying a buoyancy force of the remaining air and discharge the air to the inside of the hydraulic oil tank 1. Thereby, even when the working machine is tilted or the amount of oil delivered from the delivery pipe 3 is large, there is no risk that a situation is caused in which a lump of air is delivered from the delivery pipe 3 to the oil hydraulic equipment (not illustrated in the drawings) along with the oil.

After the air is discharged to the hydraulic oil tank 1, the buoyancy force due to the air is not applied to the valve body 22, so that the valve body 22 immediately returns to a state of being in contact with the valve seat 21*d*. Therefore, the oil does not enter the internal space 11*c* of the strainer element 11 through the valve passage 21*b* of the valve body 22, so that a situation in which oil including foreign objects is delivered to the oil hydraulic equipment (not illustrated in the drawings) is not caused.

In the first embodiment described above, the air retention chamber 21*a* is provided only in the valve main body 21. However, as in a modified example 1 illustrated in FIG. 3, an air retention chamber 12*c* may be provided only in the upper lid member 12 of the strainer element 11, the air retention chambers 21*a* and 12*c* may be provided in both the valve main body 21 and the upper lid member 12, or the strainer device 10 may be formed without providing the air retention chamber in the valve main body 21 or the upper lid member 12.

In the first embodiment described above, a spherical valve body is illustrated as the valve body 22. However, the valve body 22 need not necessarily be spherical. For example, as in a modified example 2 illustrated in FIG. 4, it is possible to apply a valve body 22' formed into a plate shape. In the same manner as in the first embodiment, the valve body 22' is formed by a material whose specific gravity is greater than that of the oil stored in the hydraulic oil tank 1. However, the valve seat 21*d* is different from that in the first embodiment. Specifically, in the modified example 2, the lower end of the large diameter portion 21*b*2 and the upper end of the small diameter portion 21b1 directly meet with each other and the valve seat 21d is formed as a circular ridge line portion between these portions.

Figure 3:
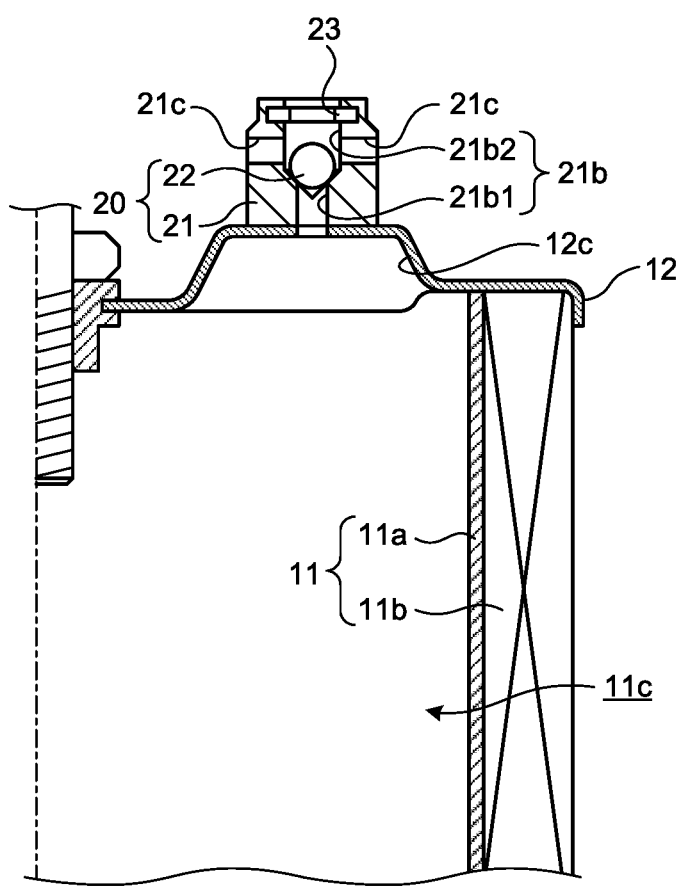
FIG. 3 is a cross-sectional view illustrating a main part of a strainer device which is a modified example 1 of the present invention.
Figure 4:
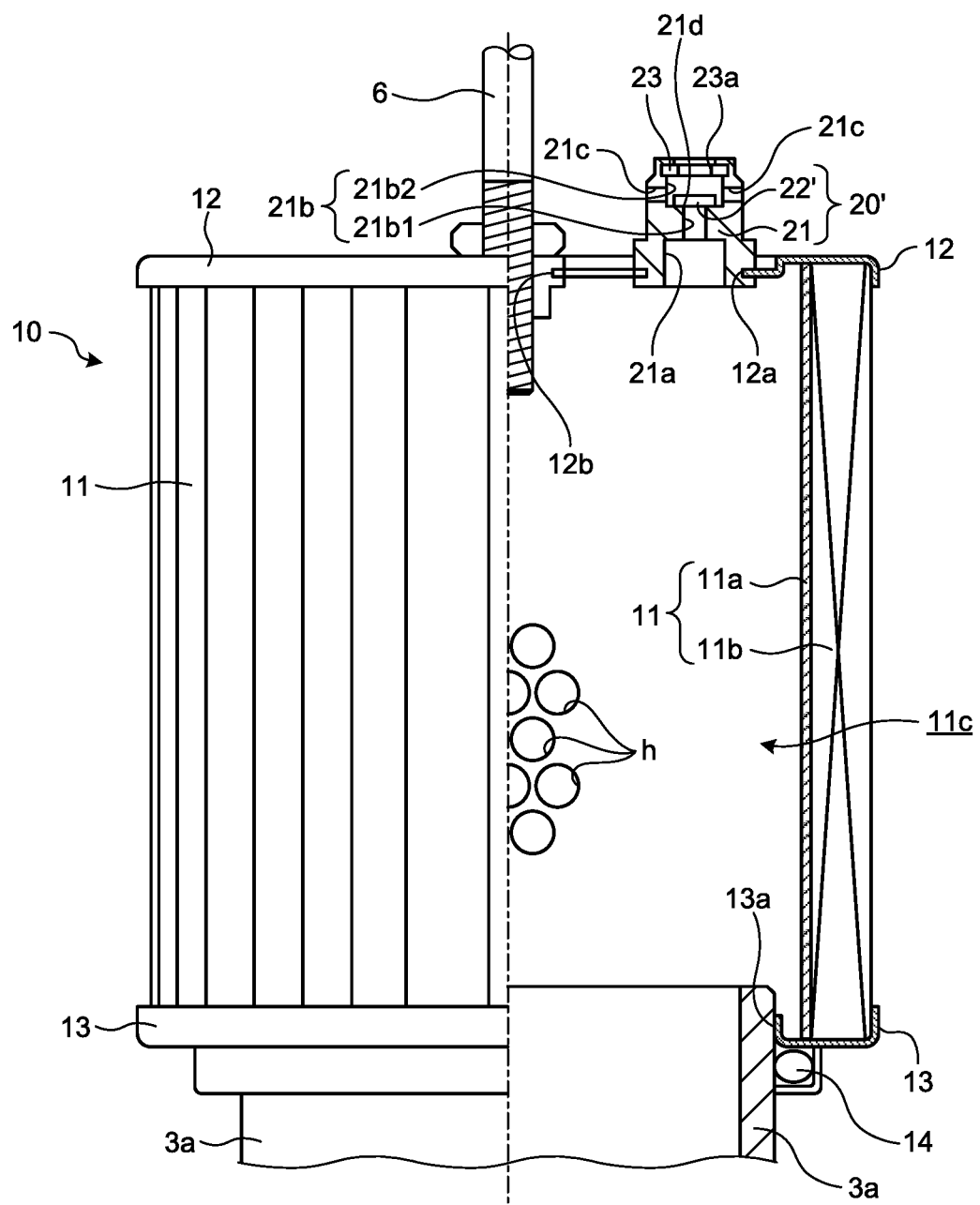
FIG. 4 is a cross-sectional view illustrating a main part of a strainer device which is a modified example 2 of the present invention.

In the modified example 1 illustrated in FIG. 3 and the modified example 2 illustrated in FIG. 4, the same components as those in the first embodiment are denoted by the same reference numerals.

Second Embodiment

Figure 5:
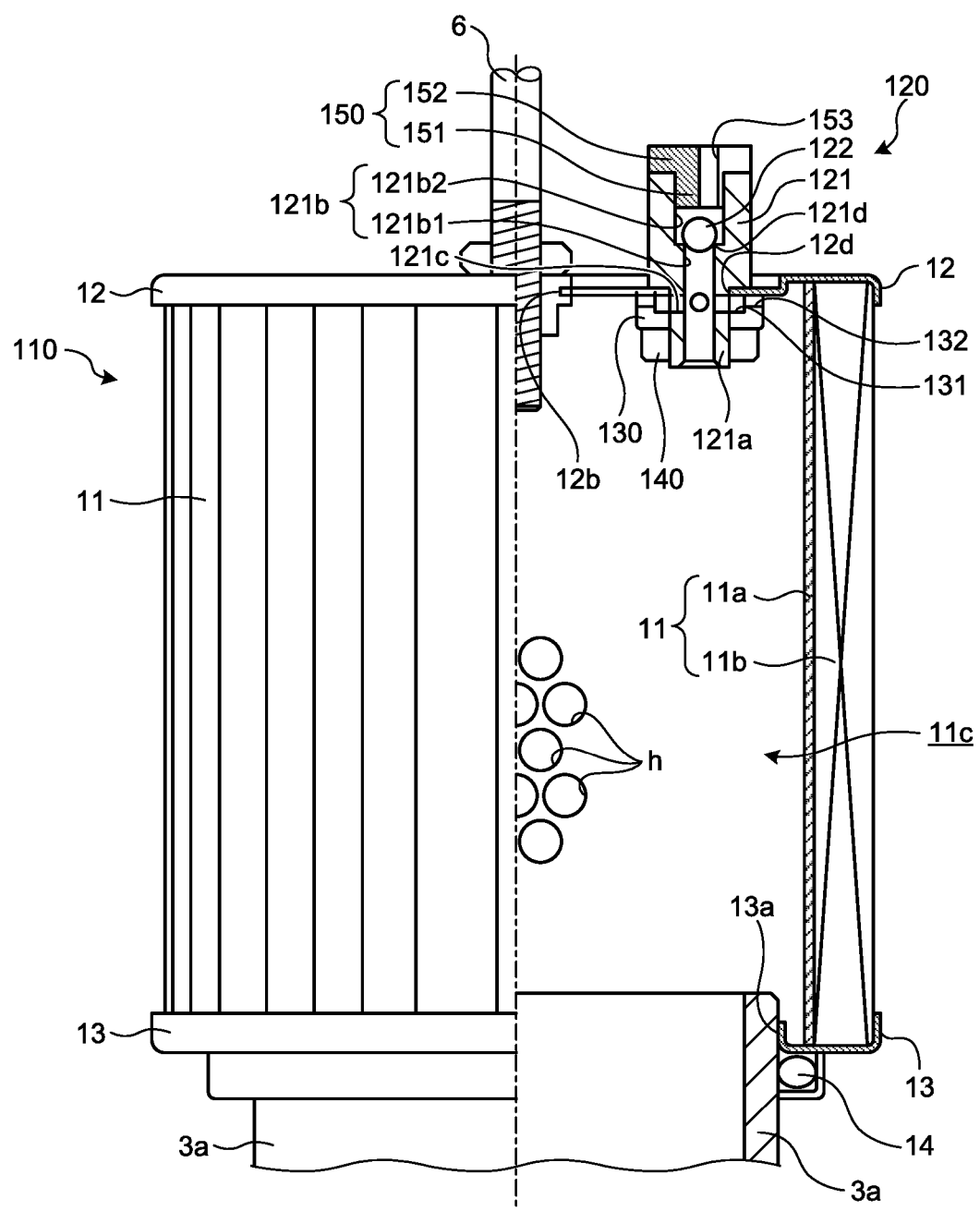
FIG. 5 is a half cross-sectional view viewed from the side of a main part of a hydraulic oil tank where a strainer device which is a second embodiment of the present invention is applied.

FIG. 5 illustrates a strainer device 110 which is a second embodiment of the present invention. The strainer device 110 illustrated here is attached to a hydraulic oil tank 1 similar to that in the first embodiment and only the configuration of a check valve 120 is different. Hereinafter, the same components as those in the first embodiment are denoted by the same reference numerals and the detailed description thereof will be omitted.

A valve main body 121 of the check valve 120 has an external form of a substantially column shape and has a screw insertion portion 121a at a lower end portion thereof. The screw insertion portion 121a has a diameter smaller than that of an upper end portion of the valve main body 121 and a male screw is formed on a circumferential surface of the screw insertion portion 121a. The valve main body 121 is attached to the upper lid member 12 by inserting the screw insertion portion 121a into an attaching hole 12d of the upper lid member 12 and then screwing an attaching nut 140 to the male screw of the screw insertion portion 121a through a washer member 130.

The valve main body 121 is provided with a valve passage 121b and an auxiliary suction passage 121c. The valve passage 121b is formed upward from a lower bottom surface of the valve main body 121 and has an opening in an upper end surface of the valve main body 121. In the second embodiment, the valve passage 121b is formed by a lower small diameter portion 121b1 and an upper large diameter portion 121b2. A valve seat 121d is formed at a connection portion between the small diameter portion 121b1 and the large diameter portion 121b2. The valve seat 121d is a circular ridge line portion formed between a lower end of the large diameter portion 121b2 and an upper end portion of the small diameter portion 121b1. The auxiliary suction passage 121c extends substantially horizontally along a radial direction from the small diameter portion 121b1 of the valve passage 121b and has an opening at a portion corresponding to the washer member 130 on an outer circumferential surface of the valve main body 121. Although not clearly illustrated in the drawings, in the second embodiment, a plurality of auxiliary suction passages 121c are provided at regular intervals with each other along a circumferential direction. In the washer member 130 faced by the opening of the auxiliary suction passage 121c, a communication groove 131 and a suction opening 132 are formed. The communication groove 131 is an annular empty space formed on an inner circumferential surface of the washer member 130. The suction opening 132 is a hole formed along a radial direction from the communication groove 131. A plurality of suction openings 132 are formed in the washer member 130.

A valve body 122 is a spherical member formed by a material such as, for example, ceramic, whose specific gravity is greater than that of the oil stored in the hydraulic oil tank 1. The valve body 122 is formed so as to have a diameter smaller than that of the large diameter portion 121b2 of the valve passage 121b and greater than that of the small diameter portion 121b1. When the valve body 122 is inserted from the large diameter portion 121b2 to the valve passage 121b, the valve body 122 comes into contact with the valve seat 121d due to the weight of the valve body 122 itself, so that it is possible to close the valve passage 121b.

As obvious from FIG. 5, a drop-off prevention plug member 150 is attached to the large diameter portion 121b2 of the valve passage 121b through a female screw provided to an opening end portion. The drop-off prevention plug member 150 is obtained by integrally forming a bolt portion 151 that is screwed into the female screw of the large diameter portion 121b2 and a plug portion 152 having substantially the same outside diameter as that of the valve main body 121. The drop-off prevention plug member 150 has a discharge passage 153 in a portion extending from an end surface of the bolt portion 151 to an end surface of the plug portion 152. The discharge passage 153 is formed to have an inside diameter smaller than the outside diameter of the valve body 122. A gap is secured along the vertical direction between the valve seat 121d of the valve passage 121b and the end surface of the bolt portion 151 so that the valve body 122 can be separated from the valve seat 121d.

In the same manner as in the first embodiment, the strainer device 110 configured as described above also removes foreign objects while the oil passes through the strainer element 11 and the oil is sucked into the internal space 11c of the strainer element 11.

When oil, where bubbles are not fully removed and bubbles are mixed, passes through the strainer element 11 and air remains as a lump in the internal space 11c of the strainer element 11 covered by the upper lid member 12, it is possible to apply a buoyancy force to the valve body 122 through the small diameter portion 121b1 of the valve passage 121b. Therefore, when the buoyancy force due to the air exceeds a force that causes the valve body 122 to come into contact with the valve seat 121d, the valve body 122 is separated from the valve seat 121d and the air remaining in the valve passage 121b is discharged to the inside of the hydraulic oil tank 1 through the valve passage 121b. Thereby, even when the working machine is tilted or the amount of oil delivered from the delivery pipe 3 is large, there is no risk that a situation is caused in which a lump of air is delivered from the delivery pipe 3 to the oil hydraulic equipment (not illustrated in the drawings) along with the oil.

In the second embodiment described above, the washer member 130 and the attaching nut 140 are attached to the screw insertion portion 121a inserted into the internal space 11c of the strainer element 11 in the valve main body 121, so that a lower end surface of the valve main body 121 protrudes downward more than the upper lid member 12. However, the auxiliary suction passage 121c is provided to the screw insertion portion 121a of the valve main body 121, and the communication groove 131 and the suction opening 132 are provided to the washer member 130, so that it is also possible to discharge air remaining in an area higher than the lower end surface of the valve main body 121 to the inside of the hydraulic oil tank 1 through the auxiliary suction passage 121c.

In any of the first embodiment, the modified example 1, the modified example 2, and the second embodiment described above, it is necessary to provide the attaching bolt insertion hole 12b at a central portion of the upper lid member 12, so that the check valve 20, 20', or 120 is provided at a position other than the central portion of the upper lid member 12. In a case where the strainer device 10 or 110 is attached to the hydraulic oil tank 1 without providing the attaching bolt insertion hole 12b, the check valve 20, 20', or 120 may be provided at the central portion of the upper lid member 12.

Third Embodiment

Figure 6:
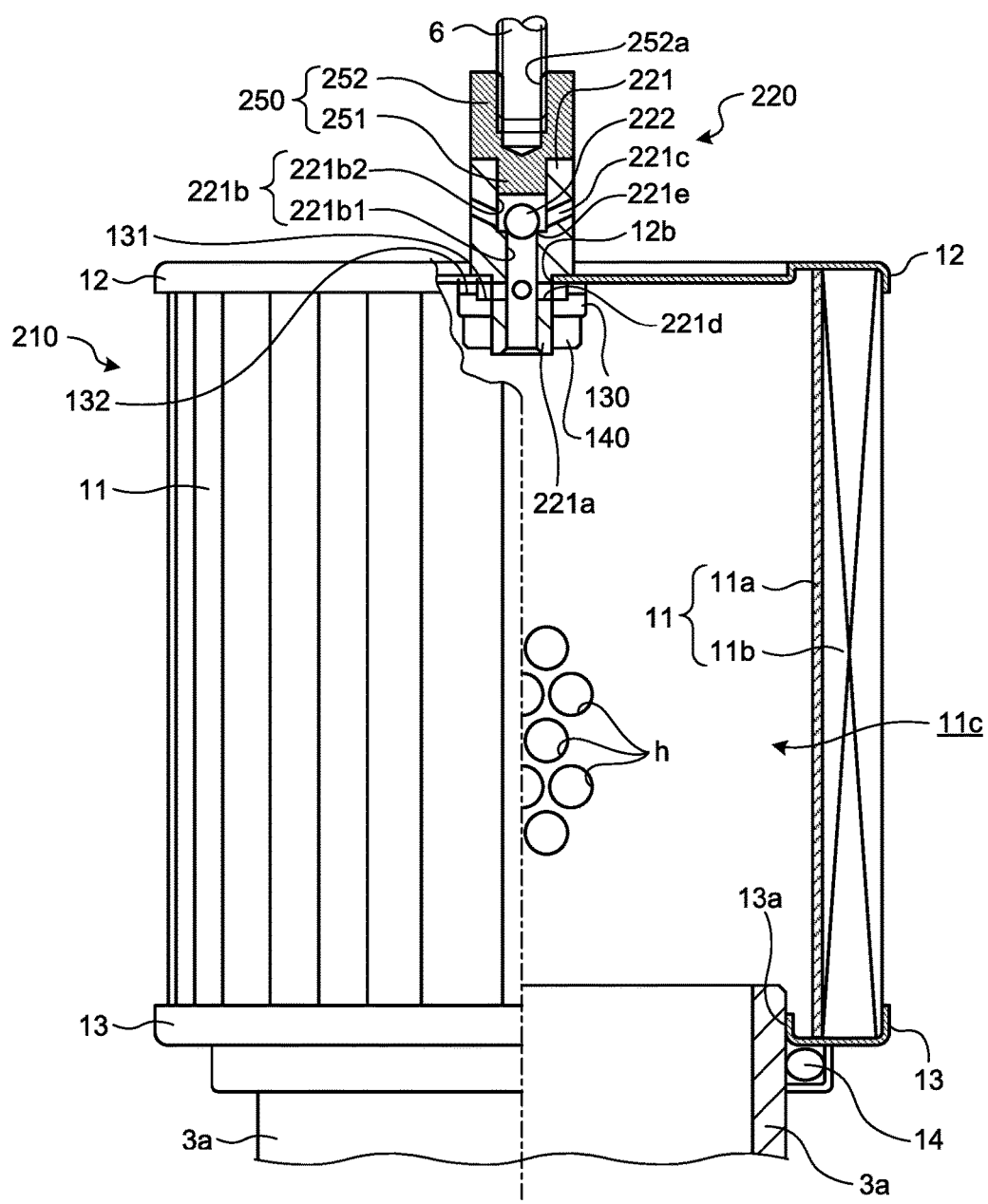
FIG. 6 is a half cross-sectional view viewed from the side of a main part of a hydraulic oil tank where a strainer device which is a third embodiment of the present invention is applied.

Further, as in the third embodiment illustrated in FIG. 6, it is possible to configure a check valve 220 by using the attaching bolt insertion hole 12b provided in the upper lid member 12. Hereinafter, a strainer device 210 of the third embodiment will be described in detail. The same components as those in the first embodiment are denoted by the same reference numerals and the detailed description thereof will be omitted.

A valve main body 221 of the check valve 220 has an external form of a substantially column shape and has a screw insertion portion 221a at a lower end portion thereof. The screw insertion portion 221a is formed to be able to be inserted into the attaching bolt insertion hole 12b of the upper lid member 12 and have a diameter smaller than that of an upper end portion of the valve main body 221. The screw insertion portion 221a has a male screw on its circumferential surface. The valve main body 221 is attached to the upper lid member 12 by inserting the screw insertion portion 221a into the attaching bolt insertion hole 12b of the upper lid member 12 and then screwing the attaching nut 140 to the male screw of the screw insertion portion 221a through the washer member 130.

The valve main body 221 is provided with a valve passage 221b, a discharge passage 221c, and an auxiliary suction passage 221d. The valve passage 221b is formed upward from a lower bottom surface of the valve main body 221 and has an opening in an upper end surface of the valve main body 221. In the third embodiment, the valve passage 221b is formed by a lower small diameter portion 221b1 and an upper large diameter portion 221b2. A valve seat 221e is formed at a connection portion between the small diameter portion 221b1 and the large diameter portion 221b2. The valve seat 221e is a circular ridge line portion formed between a lower end of the large diameter portion 221b2 and an upper end portion of the small diameter portion 221b1. The discharge passage 221c extends along a radial direction from the large diameter portion 221b2 of the valve passage 221b and has an opening in an outer circumferential surface of the valve main body 221. The discharge passage 221c is formed to have an inside diameter smaller than the outside diameter of a valve body 222 described later. As obvious from FIG. 6, the discharge passage 221c is provided at a slant so as to rise as approaching the outer circumference. The auxiliary suction passage 221d extends substantially horizontally along a radial direction from the small diameter portion 221b1 of the valve passage 221b and has an opening at a portion corresponding to the washer member 130 on an outer circumferential surface of the valve main body 221. Although not clearly illustrated in the drawings, in the third embodiment, a plurality of discharge passages 221c and a plurality of auxiliary suction passages 221d are provided at regular intervals along a circumferential direction. In the washer member 130 faced by the opening of the auxiliary suction passage 221d, a communication groove 131 and a suction opening 132 are formed in the same manner as in the second embodiment.

The valve body 222 is a spherical member formed by a material such as, for example, ceramic, whose specific gravity is greater than that of the oil stored in the hydraulic oil tank 1. The valve body 222 is formed so as to have a diameter smaller than that of the large diameter portion 221b2 of the valve passage 221b and greater than that of the small diameter portion 221b1. When the valve body 222 is inserted from the large diameter portion 221b2 to the valve passage 221b, the valve body 222 comes into contact with the valve seat 221e due to the weight of the valve body 222 itself, so that it is possible to close the valve passage 221b.

A drop-off prevention plug member 250 is attached to the large diameter portion 221b2 of the valve passage 221b through a female screw provided to an opening end portion. The drop-off prevention plug member 250 is obtained by integrally forming a bolt portion 251 that is screwed into the female screw of the large diameter portion 221b2 and a plug portion 252 having substantially the same external form as that of the valve body 222. The drop-off prevention plug member 250 has a screw hole 252a, where the attaching bolt 6 is screwed, in an upper end surface of the plug portion 252. A gap is secured along the vertical direction between the valve seat 221e of the valve passage 221b and an end surface of the bolt portion 251 so that the valve body 222 can be separated from the valve seat 221e.

In the same manner as in the first embodiment, the strainer device 210 configured as described above also removes foreign objects while the oil passes through the strainer element 11 and the oil is sucked into the internal space 11c of the strainer element 11.

When oil, where bubbles are not fully removed and bubbles are mixed, passes through the strainer element 11 and air remains as a lump in the internal space 11c of the strainer element 11 covered by the upper lid member 12, it is possible to apply a buoyancy force to the valve body 222 through the small diameter portion 221b1 of the valve passage 221b. Therefore, when the buoyancy force due to the air exceeds a force that causes the valve body 222 to come into contact with the valve seat 221e, the valve body 222 is separated from the valve seat 221e and the air remaining in the valve passage 221b is discharged to the inside of the hydraulic oil tank 1 through the discharge passages 221c. Thereby, even when the working machine is tilted or the amount of oil delivered from the delivery pipe 3 is large, there is no risk that a situation is caused in which a lump of air is delivered from the delivery pipe 3 to the oil hydraulic equipment (not illustrated in the drawings) along with the oil.

Further, the check valve 220 is provided by using the attaching bolt insertion hole 12b into which the attaching bolt 6 should have been inserted, so that there is an advantage that no additional processing is required on the upper lid member 12.

REFERENCE SIGNS LIST

1 HYDRAULIC OIL TANK
3 DELIVERY PIPE
6 ATTACHING BOLT
10, 110, 210 STRAINER DEVICE
11 STRAINER ELEMENT
11c INTERNAL SPACE
12 UPPER LID MEMBER
12c, 21a AIR RETENTION CHAMBER
13 LOWER LID MEMBER
13a FITTING HOLE
20, 120, 220 CHECK VALVE
21, 121, 221 VALVE MAIN BODY
21b, 121b, 221b VALVE PASSAGE
21d, 121d, 221e VALVE SEAT
22, 122, 222 VALVE BODY

The invention claimed is:

1. A strainer device inside a hydraulic oil tank comprising:
a strainer element having a tubular shape including an internal space at a central portion thereof;
a first lid member that covers an upper opening of the strainer element;
a second lid member that covers a lower opening of the strainer element and has a fitting hole in a portion surrounded by the strainer element;
a delivery pipe protruding upward inside the hydraulic oil tank in a state in which the delivery pipe is fitted into the fitting hole of the second lid member; and
a check valve arranged at the first lid member, the check valve including:
a valve main body having a valve passage whose one end opens to the internal space of the strainer element and whose other end opens to inside of the hydraulic oil tank, and
a valve body which is arranged to be able to move in a vertical direction with respect to a valve seat provided in the valve passage and which comes into contact with the valve seat by its own weight and closes the valve passage wherein a specific gravity of the valve body is greater than the hydraulic oil;
wherein the strainer device filters hydraulic oil with the strainer element when delivering hydraulic oil stored in the hydraulic oil tank from the delivery pipe, and
a level of the hydraulic oil in the hydraulic oil tank is above the check valve.

2. The strainer device according to claim 1, wherein when a preset amount of air is retained in the internal space of the strainer element, the valve body in the check valve is separated from the valve seat by a buoyancy force of the air and opens the valve passage.

3. The strainer device according to claim 1, wherein the check valve is provided so as to form an air retention chamber that stores the air retained in the internal space of the strainer element and discharge the air stored in the air retention chamber to the hydraulic oil tank.

4. The strainer device according to claim 3, wherein the air retention chamber is provided on the first lid member.

5. The strainer device according to claim 3, wherein the air retention chamber is provided on the valve main body.

* * * * *